No. 871,758. PATENTED NOV. 19, 1907.
E. HEITMANN & F. W. YOUNG.
BRIDGING BLOCKS FOR DYNAMO ELECTRIC MACHINES.
APPLICATION FILED OCT. 18, 1906.
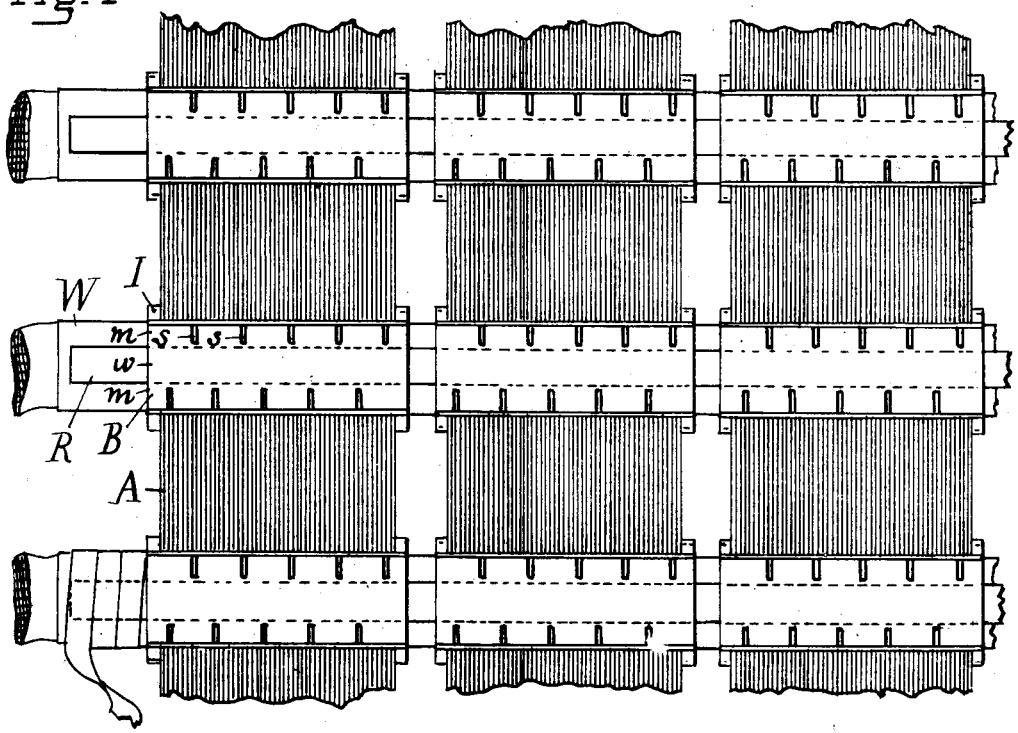
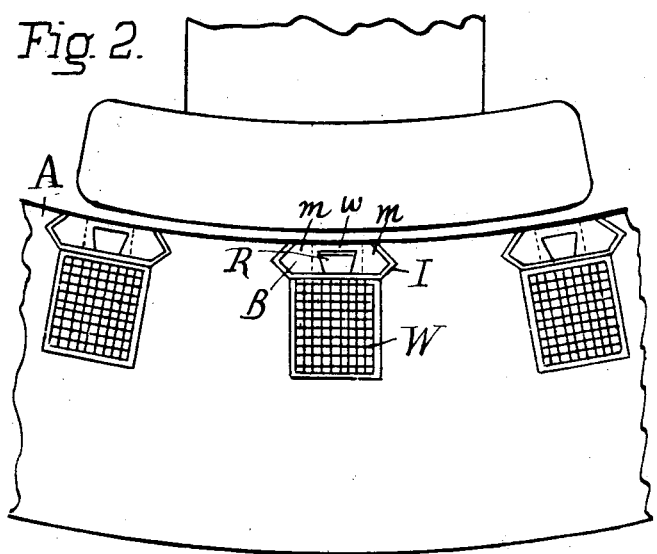
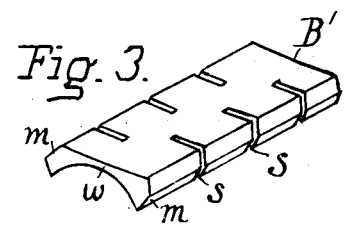
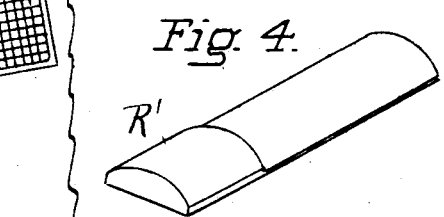
Witnesses:
Inventors,
Edward Heitmann
Frederick W. Young
by Thomas Ewing, Jr.,
Attorney.

UNITED STATES PATENT OFFICE.

EDWARD HEITMANN, OF MONTCLAIR, AND FREDERICK WM. YOUNG, OF EAST ORANGE, NEW JERSEY, ASSIGNORS TO CROCKER-WHEELER COMPANY, OF AMPERE, NEW JERSEY, A CORPORATION OF NEW JERSEY.

BRIDGING-BLOCKS FOR DYNAMO-ELECTRIC MACHINES.

No. 871,758.　　　　Specification of Letters Patent.　　　　Patented Nov. 19, 1907.

Application filed October 18, 1906. Serial No. 339,437.

*To all whom it may concern:*

Be it known that we, EDWARD HEITMANN, residing at Montclair, in the county of Essex and State of New Jersey, and FREDERICK WM. YOUNG, residing at East Orange, in the county of Essex and State of New Jersey, both citizens of the United States of America, have invented a new and useful Improvement in Bridging-Blocks for Dynamo-Electric Machines, of which the following is a specification.

Alternating current machines such as alternators and induction motors are more economical as regards material when designed with slots which are entirely or partly bridged at the surface by magnetic material. Bridging of slots by magnetic material is also of importance in steam or gas-engine driven alternators, since the driving torque lacks uniformity. An element of steadiness of operation is secured by employing a rotor with solid poles in which currents are set up when such irregularities of driving torque occur, and so furnish a countertorque. But with such solid poles a practically uniform magnetic flux distribution across the polar faces of the rotor must be secured to prevent heavy losses during normal operation. If a toothed core of laminated iron with windings between the teeth is used in the stator, if the slot is not inconveniently narrow, means must be provided for a substantial magnetic closure of the slots above the windings.

Our invention relates to a means for effecting such closure, which in brief consists of the employment of bridging blocks of cast iron or iron with similar electrical and magnetic properties which are so shaped that they will secure the required uniformity of distribution of magnetic flux without affording a seat for harmful eddy currents.

A further object of this invention is to provide these bridging blocks of such form as will be inexpensive of manufacture, easy to assemble and easy to secure firmly so that they will form with the core and windings a mechanically rigid structure.

In the accompanying sheet of drawings, which forms a part of this application, Figure 1 is a plan of a portion of a stator of an alternator showing portions of three windings set in slots of the laminated stator ring, and covered by bridging blocks embodying our invention. Fig. 2 is a face view of a portion of the stator including three slots, windings therefor and bridging blocks, the windings being in section. Fig. 3 is a perspective view of a modified form of bridging block. Fig. 4 is a perspective view of one end of a wooden rod or wedge used with this second form of bridging block.

In the form shown in Figs. 1 and 2, our invention is illustrated in connection with a toothed armature A which forms the stator element of an alternating current generator. The core of the armature, as illustrated, comprises a number of groups of toothed laminæ suitably spaced for ventilation. The teeth are under-cut or dovetailed near their tips and bridging blocks B engage the dovetail spaces between the adjacent teeth of each group of laminæ above the windings W. These blocks are of magnetic material, as cast iron or malleable iron, which latter is in fact and is to be understood to be cast iron modified to a greater or less depth from the surface to reduce brittleness, or they may be of kinds of steel possessing high resistivity like cast iron. Such magnetic material is preferable, because, while having ample magnetic conductivity, it possesses considerable specific electrical resistance or resistivity, so that eddy currents will be damped. Further to damp such currents, slits $s$, $s$ may be cut into the blocks from the edges next to the teeth. These slits lie in the same direction as the laminæ and are transverse to such eddy currents as the operation of the machine would chiefly tend to generate. These slits consequently tend to break up such currents. The bulk of the material comprising each block lies along the two edges next to the armature teeth and each block may be said to consist chiefly of two parallel contacting members $m$ $m$ next to or in contact with the teeth and a thin web $w$ which joins the contacting members. A sufficient magnetic path to the tooth on either side is afforded for all lines of force entering the polar surface of the block, thus making the bridged slot equivalent to an inclosed slot. By reason of the thinness of the connecting web, the magnetic flux from one tooth to the next adjacent above the windings and due to the current in these windings, is reduced to a minimum, so that the reactance of windings embedded in a bridged slot is as low or nearly as low as that of windings embedded in a partly inclosed slot. Or, to state the effect somewhat differently, by reason of the blocks being thin along their middle lines, there is secured the most effective distribution of material in the blocks for the distribution of the magnetic flux and the reduction of eddy currents to a minimum. And there is also afforded space for the insertion of wooden or other rods for binding down the windings and fastening the blocks in the slots. Insulation I, for which fiber or paper are suitable materials, or for which hard japan may be used, is placed between the blocks and the teeth. In the form illustrated, the blocks have each a length which is about equal to the thickness of a group of laminæ, as this length forms a convenient unit for handling, and is less likely to be broken than a longer block in driving into place. There are as many blocks in each slot as there are groups of laminæ composing the armature core, so that there will be a minimum of obstruction of the ventilating spaces between groups of laminæ by the blocks. In each slot a wooden rod or wedge R is driven under all of the blocks in the slot and between the blocks and the windings, and the parts are thereby firmly secured in place. These rods or wedges project beyond the ends of the end-blocks of each slot and are taped to the windings.

In the form shown in Figs. 1 and 2 longitudinal dovetail slots are provided in the blocks to receive the wooden rods or wedges. In the form shown in Figs. 3 and 4 the undersides of the blocks are made concave and the wooden rods have one side rounded, so that they bind between the blocks and windings instead of in the blocks chiefly.

While we have shown and described our invention as applied to a machine in which the armature member forms the stator, it will be obvious that it is also applicable to a machine having a rotating armature.

What we claim as new and desire to secure by Letters Patent of the United States is:

1. The combination of a slotted dynamo-electric machine element, windings located in the slots, and cast iron bridging blocks insulated from the element and consisting of parallel contacting members joined by thin webs, substantially as described.

2. The combination of a slotted dynamo-electric machine element, windings located in the slots, and cast iron bridging blocks located in the slots above the windings, substantially as described.

3. The combination of a slotted dynamo-electric machine element, windings located in the slots, and bridging blocks of magnetic material located in the slots above the windings, the contacting edges of which are transversely slotted, substantially as described.

4. The combination of a slotted dynamo-electric machine element, windings located in the slots, and transversely slotted cast iron bridging blocks located in the slots above the windings, substantially as described.

5. The combination of a slotted dynamo-electric machine element, windings located in the slots, and bridging blocks of magnetic material consisting of parallel contacting members transversely slotted and joined by thin webs, substantially as described.

6. The combination of a slotted dynamo-electric machine element, windings located in the slots, bridging blocks of magnetic material in each slot, grooved longitudinally, and a non-conducting strip fitted in the grooves and connecting the bridging blocks in each slot, substantially as described.

7. The combination of a slotted dynamo-electric machine element, windings located in the slots, bridging blocks of magnetic material transversely slotted and grooved longitudinally, and non-conducting strips fitted in the grooves and connecting the bridging blocks in each slot, substantially as described.

8. The combination of a slotted dynamo-electric machine element, windings located in the slots, bridging blocks of magnetic material consisting of parallel contacting members transversely slotted and joined by thin webs, and non-conducting strips fitted between the bridging blocks and the windings, substantially as described.

9. The combination of a slotted dynamo-electric machine element consisting of groups of laminæ with ventilating spaces between the groups, windings located in the slots, and a series of bridging blocks in each slot the ends of which are spaced apart opposite the ventilating spaces in the element, substantially as described.

10. The combination of a slotted dynamo-electric machine element consisting of groups of laminæ with ventilating spaces between the groups, windings located in the slots, a series of bridging blocks in each slot the ends of which are spaced apart opposite the ventilating spaces in the element, and a non-conducting strip fitted between each series of bridging blocks and the windings, substantially as described.

Signed by us at East Orange, New Jersey, this 17th day of October, 1906.

EDWARD HEITMANN.
FREDERICK WM. YOUNG

Witnesses to both signatures:
SAMUEL W. BALCH,
HARVEY C. HARRISON.